J. J. JUSTIN.
Bee Hive.
No. 56,230.
Patented July 10, 1866.
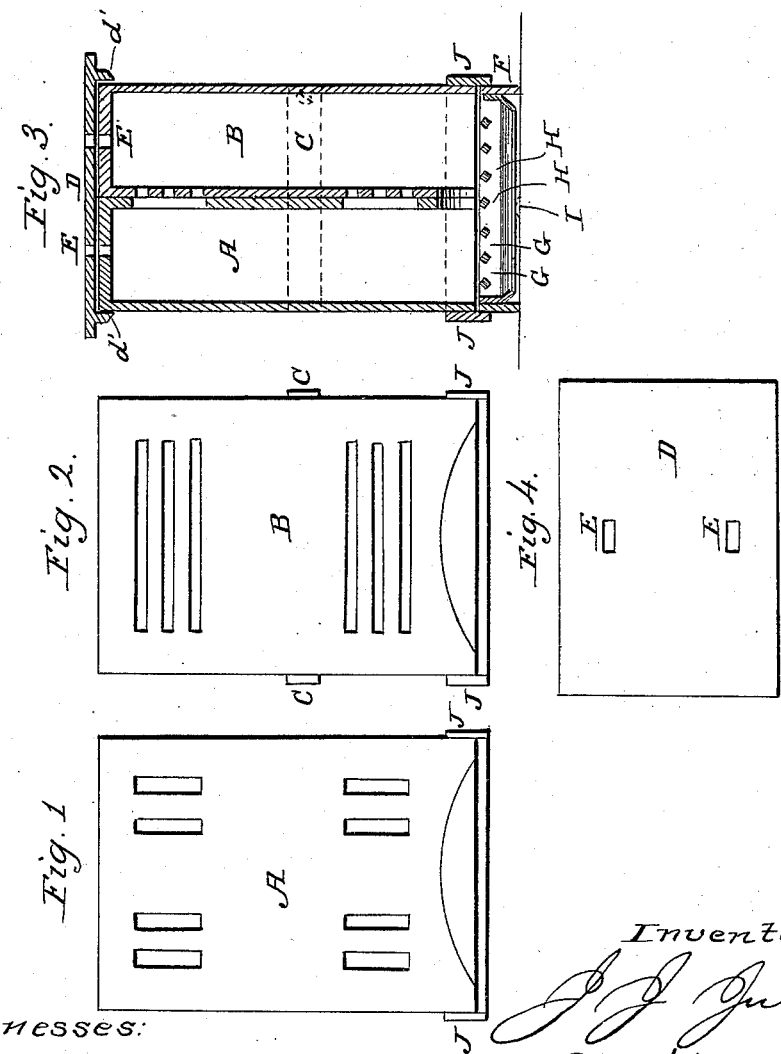

UNITED STATES PATENT OFFICE.

JULIUS J. JUSTIN, OF MILWAUKEE, WISCONSIN.

IMPROVEMENT IN BEE-HIVES.

Specification forming part of Letters Patent No. 56,230, dated July 10, 1866.

*To all whom it may concern:*

Be it known that I, JULIUS J. JUSTIN, of Milwaukee, in the county of Milwaukee and State of Wisconsin, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 is an inner side view of one part of my improved bee-hive. Fig. 2 is an inner side view of the other part of the same. Fig. 3 is a vertical central cross-section of the entire hive. Fig. 4 is a top or plan view of the hive.

Similar letters of reference indicate like parts.

My invention has for its object to furnish a bee-hive with means by which bees may be prevented from swarming, and at the same time the number of swarms increased and the bees protected from moth; and it consists of a bee-hive formed by combining two rectangular boxes or hives with each other and with the moth-protection frame, as hereinafter more fully described.

A and B are rectangular boxes or hives, of such a size that when placed together in the manner represented in Fig. 3 they may form a hive of the ordinary size. The inner side walls of the boxes or half-hives A and B are slotted in both their upper and lower parts, the one with vertical slots and the other with horizontal slots, as represented in Figs. 1 and 2. When the boxes A and B are placed together, as seen in Fig. 3, these slots cross each other, forming passage-ways for the bees in passing from one part of the hive to the other. The lower part or edge of these partition-walls or inner sides may be cut away, as shown in Figs. 1, 2, and 3, so that the bees may have unimpeded communication from one part of the hive to the other.

The boxes A and B are held in proper position, when placed together, by the bars or braces C, which are screwed to the boxes, as represented in dotted lines in Fig. 3. The boxes A and B are also further secured in place by the cover D, which covers the top of both boxes, and is furnished with downwardly-projecting cleats $d'$, which surround the upper ends of the boxes A and B, as represented in Fig. 3, and keep them from getting out of place.

E are holes made through the tops of the boxes A and B, and also through the cover D. These holes are plugged up, except when the plugs are removed to allow small boxes to be placed upon the top of the hive for the reception of honey.

The moth-protection frame F consists of a square box or frame a few inches in height, and of the same size as the hive when the two parts are placed together. Across this frame, near its upper edge, are placed slats G, as shown in Fig. 3. Around this frame, on the inside, is a placed a zinc guard, H, projecting inward and downward, as shown in Fig. 3. If the moths find their way into the hive and attempt to crawl up the side of the frame, they find their way intercepted by the guard H, over which they are unable to pass. The bees enter through the hole I formed in the lower edge of the frame.

The two hives, when attached together, are both placed upon the frame F, where they are kept in place by the cleats J, attached to the lower edges of the boxes A and B, and projecting downward so as to overlap the upper edges of the frame F.

The boxes A and B must all be made of the same dimensions, so that they will fit together indiscriminately; then, when the season for swarming arrives, the cover D and the braces or bars C are removed and the hive divided, and each full half connected with an empty half, thus forming two hives, one-half of each being full and one-half empty. It is true that one of the hives will have a queen-bee and the other will not; but the destitute hive, having cells of young bees, the bees therein can soon furnish themselves with a queen.

Toward the latter part of the season the hives may be again divided, or the plugs may be removed from the holes E and small boxes placed upon the top of the cover D, which the bees will fill with honey.

I claim as new and desire to secure by Letters Patent—

The combination of the boxes A B, slotted as described, slats G, and projecting guards H, arranged and operating in the manner and for the purpose herein specified.

JULIUS J. JUSTIN.

Witnesses:
WM. FRANKFURTH,
CHAS. C. RATTINGER.